United States Patent Office 3,024,269
Patented Mar. 6, 1962

3,024,269
PENTACHLOROPHENYL CARBANILATES
Eric Barthel, Jr., and Raymond W. Luckenbaugh, Wilmington, and Jerry A. Nelson, Newark, Del., assignors to E. I. du Pont de Nemours and Company, Wilmington, Del., a corporation of Delaware
No Drawing. Filed Mar. 18, 1957, Ser. No. 646,559
1 Claim. (Cl. 260—471)

This invention relates to new compounds of the formula:

(1) 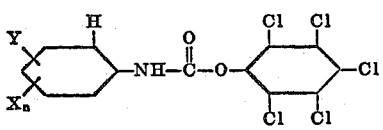

wherein X is halogen or alkyl of 1 through 4 carbon atoms; Y is hydrogen, isocyanato (—NCO) or nitro (—NO$_2$), and $n$ is a whole integer of 1–3, that is, 1, 2 or 3; and methods for their preparation.

The compounds of the invention can be prepared by various conventional means. For example, they can be prepared by the reaction of stoichiometric amounts of a substituted phenyl isocyanate and pentachlorophenol in the presence of a catalytic amount of a tertiaryamine base, such as pyridine or triethylamine, in accordance with the following equation:

(2) 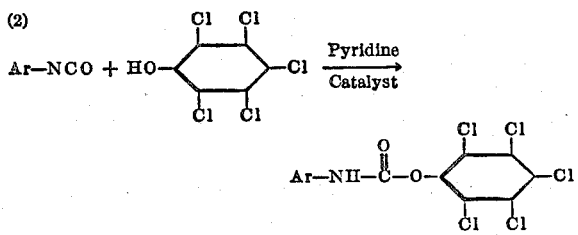

The reaction is advantageously carried on in an organic liquid media that is inert to the other materials present. Suitable organic liquids for this purpose are benzene, toluene, xylene and dioxane. The reaction can be carried out at a temperature in a range of about 5 to 130° C.

The substituted phenylisocyanates used in the synthesis of our compounds can be prepared by conventional methods, such as by the reaction of a substituted aniline with phosgene.

Illustrative of the compounds of our invention are the pentachlorophenyl esters of the following carbanilic acids.

p-Chlorocarbanilic acid
m-Chlorocarbanilic acid
3,4-dichlorocarbanilic acid
2,4,5-trichlorocarbanilic acid
p-Methylcarbanilic acid
m-Methylcarbanilic acid
3-chloro-4-methylcarbanilic acid
p-Ethylcarbanilic acid
p-Isopropylcarbanilic acid
3,4-dimethylcarbanilic acid
3-chloro-4-isopropylcarbanilic acid
4-chloro-3-nitrocarbanilic acid
m-Fluorocarbanilic acid
p-Bromocarbanilic acid
p-Iodocarbanilic acid
3-isocyanate-4-methylcarbanilic acid
2,5-dibromocarbanilic acid The compounds of this invention are particularly good herbicides. It has been found that the undesirable growth of vegetation can be controlled by application at a dosage of about 40 to 100 gallons per acre of foliar sprays containing from 0.5 to 5% by weight of herbicidally active carbanilic acid ester. Alternatively, the active carbanilic acid ester can be applied as a soil drench at the rate of about 500 to 2,000 gallons per acre of aqueous compositions containing from about 0.1 to 1% by weight of the active ingredient. As a pre-emergence herbicide for the control of emerging weed seedlings from about ¼ to 12 pounds per acre of active ingredient is usually employed. Dust compositions containing from 5 to 30% by weight of the active ingredient are effective in controlling the growth of seeds when applied at rates of 5 to 100 pounds per acre of active ingredient.

These compounds can be formulated into compositions suitable for application by admixing one or more of such compounds in herbicidally effective amounts with a liquid or powdered solid conditioning agent of the kind used and referred to in the art as a pest control adjuvant or modifier. Thus the active compounds can be formulated with one or more of the pest control adjuvants set forth in Todd Patent No. 2,655,447. In general, from about 0.5% to 95% by weight of the active ingredient is present in our compositions.

The preferred compositions are in the form of dusts or wettable powders. They are compounded to be homogeneous and free-flowing by admixing the active compounds or compounds with finely divided solids such as talcs, natural clays, pyrophyllite, diatomaceous earth, walnut shell flour, redwood flour and other inert solid conditioning agents or carriers of the kind conventionally employed in preparing pest-control compositions in dust form.

Liquid compositions are prepared in the usual way by forming a solution or suspension of one or more of the active compounds with a suitable liquid pest-control adjuvant such as those set forth in the aforementioned Todd patent.

Herbicidal compositions of the invention, whether in the form of solids or liquids can also contain a surface active agent of the kind sometimes referred to in the art as a wetting, dispersing or emulsifying agent. Generally, the surface active agents will comprise not more than 5 to 10 percent by weight of a composition and in some compositions the percentage will be considerably less than 1 percent. A detailed list of such agents is set forth in an article by McCutcheon in "Soap and Chemical Specialties," volume 31, No. 7, pages 50 to 61; No. 8, pages 48 to 61; No. 9, pages 52 to 67; and No. 10, pages 48 to 67 (1955). See also McCutcheon in "Chemical Industries," November 1947, page 811 entitled "Synthetic Detergents" and Bulletin E–607 of the Bureau of Entomology and Plant Quarantine of the U.S. Department of Agriculture.

Other pest-control agents such as insecticides, fungicides and other herbicides can also be included in the herbicidal compositions of our invention. In fact, perhaps the best of our herbicidal compositions are those that contain in addition to an active compound of the type represented by Formula 1, one or more of the well known herbicidally active aryl aliphatic ureas, such as those described in Todd Patent Nos. 2,655,444 through 2,655,447.

The compositions containing pentachlorophenyl carbanilic acid ester and an aryl aliphatic urea can be made by mixing the various ingredients in any desired ratio to give a suitable formulation. On the other hand it is often convenient to prepare both the ester and urea simultaneously by reacting only part of the aryl isocyanate with pentachlorophenol and the remainder with an appropriate amine. The reaction product consists of a mixture of the ester and the urea. The relative proportions of the two ingredients are determined by the proportion of the isocyanate that is reacted with the pentachlorophenol and the amine.

In order to more clearly illustrate our invention, the following examples are given in addition to those set forth above:

EXAMPLE 1

A mixture of 26.6 parts by weight of pentachlorophenol, 200 parts of dry benzene and 0.2 part of pyridine is warmed to 40° C. to obtain a solution. To this solution is added 15.4 parts by weight of p-chlorophenylisocyanate dissolved in 50 parts of benzene. The solution is then refluxed on a steam bath overnight, cooled and the precipitate removed by filtration.

After washing with n-pentane and air drying, a total of 30.9 parts of crude pentachlorophenylester of p-chlorocarbanilic acid is formed. This is found to have a melting point of 159.5–174° C. Subsequently crystallizations from benzene and then from ethylacetate yield white needles of pure pentachlorophenylester of p-chlorocarbanilic acid, having a melting point of 164.5–173° C.

Analysis.—Calc'd for $C_{13}H_5Cl_6NO_2$: Cl, 50.66; N, 3.33. Found: Cl, 50.55; N, 3.30.

EXAMPLES 2–17

The procedure of Example 1 is used for preparing the following pentachlorophenylesters of carbanilic acids by substituting for the p-chlorophenylisocyanate of Example 1 the various aryl isocyanates in the listed amounts.

| Ex. No. | Name of isocyanate | Weight of isocyanate | Name of product is the pentachlorophenylester of— |
|---|---|---|---|
| 2 | m-Chlorophenyl- | 15.4 | m-Chlorocarbanilic acid. |
| 3 | 3,4-dichloro-phenyl- | 18.8 | 3,4-dichlorocarbanilic acid. |
| 4 | 2,4,5-trichloro-phneyl- | 22.3 | 2,4,5-trichlorocarbanilic acid. |
| 5 | p-Tolyl- | 13.3 | p-Methylcarbanilic acid. |
| 6 | m-Tolyl- | 13.3 | m-Methylcarbanilic acid. |
| 7 | 3-chloro-p-toyl- | 16.8 | 3-chloro-4-methylcarbanilic acid. |
| 8 | p-Ethylphenyl- | 15.9 | p-Ethylcarbanilic acid. |
| 9 | p-Cumenyl- | 17.3 | p-Isopropylcarbanilic acid. |
| 10 | 3,4-xylyl- | 15.9 | 3,4-dimethylcarbanilic acid. |
| 11 | 3-chloro-p-cumenyl- | 19.4 | 3-chloro-4-isopropyl-carbanilic acid. |
| 12 | 4-chloro-3-nitrophenyl- | 19.9 | 4-chloro-3-nitrocarbanilic acid. |
| 13 | m-Fluorophenyl- | 13.7 | m-Fluorocarbanilic acid. |
| 14 | p-Bromophenyl- | 19.8 | p-Bromocarbanilic acid. |
| 15 | p-Iodophenyl- | 24.5 | p-Iodocarbanilic acid. |
| 16 | 2,5-dibromophenyl- | 27.7 | 2,5-dibromocarbanilic acid. |
| 17 | 3-isocyanato-p-tolyl- | 17.4 | 3-isocyanato-4-methylcarbanilic acid. |

These products are in most instances crystalline solids that are insoluble in water and only slightly soluble in most hydrocarbon solvents.

EXAMPLE 18

Wettable Powder Compositions

The following wettable powder compositions are prepared by combining the dry ingredients listed, blending in a ribbon blender, micropulverizing in a hammer mill until substantially all of the product is below 50 microns, and then reblending the product in a ribbon blender to give a free flowing powder that is readily dispersed in water to form dilute sprayable formulations.

A

| | Percent |
|---|---|
| Pentachlorophenylester of p-chlorocarbanilic acid | 80 |
| Dry Attapulgite | 18 |
| Alkyl aryl sulfonate | 1.75 |
| Low viscosity methylcellulose | 0.25 |

B

| | |
|---|---|
| Pentachlorophenylester of p-fluorocarbanilic acid | 50 |
| China clay | 47.5 |
| Alkyl aryl sulfonate | 1.5 |
| Lignin sulfonate | 1.0 |

C

| | |
|---|---|
| Pentachlorophenylester of 3,4-dichlorocarbanilic acid | 80 |
| Dry Attapulgite | 16.25 |
| Alkyl aryl sulfonate | 1.75 |
| Lignin sulfonate | 2.0 |

These compositions are then extended with water to form sprayable formulations containing 1% by weight of the active ingredients. When sprayed from a tractor-mounted sprayer onto a field seeded in corn, excellent pre-emergence weed control is obtained without excessive crop damage.

EXAMPLE 19

Dust Compositions

The following dust compositions are prepared by mixing the active component with the absorptive diluent, micropulverizing the mixture, adding the principal diluent and then blending in a ribbon blender.

A

| | Percent |
|---|---|
| Pentachlorophenylester of m-chlorocarbanilic acid | 10 |
| Dry Attapulgite | 10 |
| Talc | 80 |

B

| | |
|---|---|
| Pentachlorophenyl ester of 2,4,5-trichlorocarbanilic acid | 20 |
| Dry Attapulgite | 20 |
| Pyrophyllite | 60 |

C

| | |
|---|---|
| Pentachlorophenyl ester of p-bromocarbanilic acid | 10 |
| Dry Attapulgite | 10 |
| Pyrophyllite | 80 |

D

| | |
|---|---|
| Pentachlorophenyl ester of 3,4-dichlorocarbanilic acid | 10 |
| 3-(3,4-dichlorophenyl)-1,1-dimethylurea | 10 |
| Dry Attapulgite | 20 |
| Talc | 60 |

E

| | |
|---|---|
| Pentachlorophenyl ester of p-chlorocarbanilic acid | 5 |
| 3-(p-chlorophenyl)-1,1-dimethylurea | 15 |
| Dry Attapulgite | 20 |
| Talc | 60 |

F

| | |
|---|---|
| Pentachlorophenyl ester of p-ethylcarbanilic acid | 15 |
| 3-(p-ethylphenyl)-1-methyl-1-isopropylurea | 5 |
| Dry Attapulgite | 10 |
| Pyrophyllite | 70 |

These compositions, when dusted by hand on weeds growing around a warehouse, give extremely effective weed control.

EXAMPLE 20

Water-Dispersions

The following water dispersions are made by milling in a ball mill or in a sand mill the listed components with water. The compositions are as follows:

A

| | Percent |
|---|---|
| Pentachlorophenyl ester of carbanilic acid | 30 |
| Hydrated Attapulgite | 1.75 |
| Lignin sulfonate | 15 |
| Water | 52.75 |
| Sodium pentachlorphenate | 0.5 |

B

| | |
|---|---|
| Pentachlorophenyl ester of m-fluorophenylcarbanilic acid | 40 |
| Hydrated Attapulgite | 1.75 |
| Lignin sulfonate | 5 |
| Water | 52.75 |
| Sodium pentachlorphenate | 0.5 |

These compositions are then sprayed from a tractor mounted sprayer on a field planted with cotton seed. This treatment is found to give excellent pre-emergence weed control.

EXAMPLE 21

*Oil Dispersions*

The following oil dispersions are prepared by milling, such as in a sand mill or a ball mill, the listed ingredients:

A

| | Percent |
|---|---|
| Pentachlorophenyl ester of p-chlorocarbanilic acid | 25 |
| Diesel oil | 75 |

B

| | |
|---|---|
| Pentachlorophenyl ester of 3,4-dichlorocarbanilic acid | 25 |
| Diesel oil | 75 |

These oil dispersions, when sprayed from a railroad spray car along the railroad right-of-way, give excellent control of the weeds growing on the railroad embankment.

EXAMPLE 22

*Pellet Compositions*

The following pellet compositions are prepared by intimately mixing the listed ingredients with a very small amount of water in a ribbon blender, and then extruding the mass under high pressure through a ⅛ inch diameter dye while cutting the extruded material into short lengths. The compositions are as follows:

A

| | Percent |
|---|---|
| Pentachlorophenyl ester of p-iodocarbanilic acid | 40 |
| Hydrated Attapulgite | 39 |
| Alkyl aryl sulfonate | 1 |
| Sodium sulfate, anhydrous | 20 |

B

| | |
|---|---|
| Pentachlorophenyl ester of 3-isocyano-4-methylcarbanilic acid | 40 |
| Hydrated Attapulgite | 39 |
| Alkyl aryl sulfonate | 1 |
| Sodium sulfate, anhydrous | 20 |

C

| | |
|---|---|
| Pentachlorophenyl ester of 4-chloro-3-nitro-carbanilic acid | 30 |
| Hydrated Attapulgite | 55 |
| Sodium sulfate | 15 |

D

| | |
|---|---|
| Pentachlorophenyl ester of 3-chloro-4-isopropylcarbanilic acid | 20 |
| 1-(m-tolyl)-1,3,3 trimethylurea | 20 |
| Hydrated Attapulgite | 39 |
| Alkyl aryl sulfonate | 1 |
| Sodium sulfate, anhydrous | 20 |

E

| | |
|---|---|
| Pentachlorophenyl ester of 2,5-dibromocarbanilic acid | 10 |
| 3-(2,5-dibromophenyl)-3-methyl-1-butylurea | 20 |
| Hydrated Attapulgite | 55 |
| Sodium sulfate, anhydrous | 15 |

These pellets are scattered by hand on clumps of bindweed growing in a cultivated field. It is found that this treatment gives excellent control of this weed.

What is claimed is:

Pentachlorophenyl ester of parachlorocarbanilic acid.

References Cited in the file of this patent

UNITED STATES PATENTS

| | | |
|---|---|---|
| 2,594,278 | Baumgartner | Apr. 29, 1952 |
| 2,658,071 | Beman | Nov. 3, 1953 |
| 2,734,911 | Strain | Feb. 14, 1956 |
| 2,858,328 | Beaver et al. | Oct. 28, 1958 |
| 2,951,786 | Pullen et al. | Sept. 6, 1960 |

OTHER REFERENCES

Beilstein: 12, 327 (1929).

Thompson: Botanical Gazette, 107, 504 (1946).

Immelman et al.: Chem. Abst., 45, 3980 (1951).